Jan. 11, 1944.                L. HATHAWAY                2,338,718
                          CENTRIFUGAL GOVERNOR
                        Filed May 22, 1942           2 Sheets-Sheet 1

Inventor
LAWRENCE HATHAWAY,
By Robert B. Pearson
                Attorney

Jan. 11, 1944.  L. HATHAWAY  2,338,718
CENTRIFUGAL GOVERNOR
Filed May 22, 1942  2 Sheets-Sheet 2
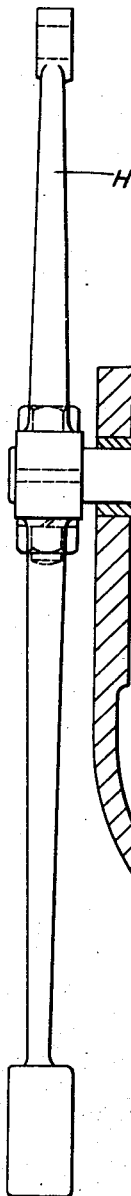
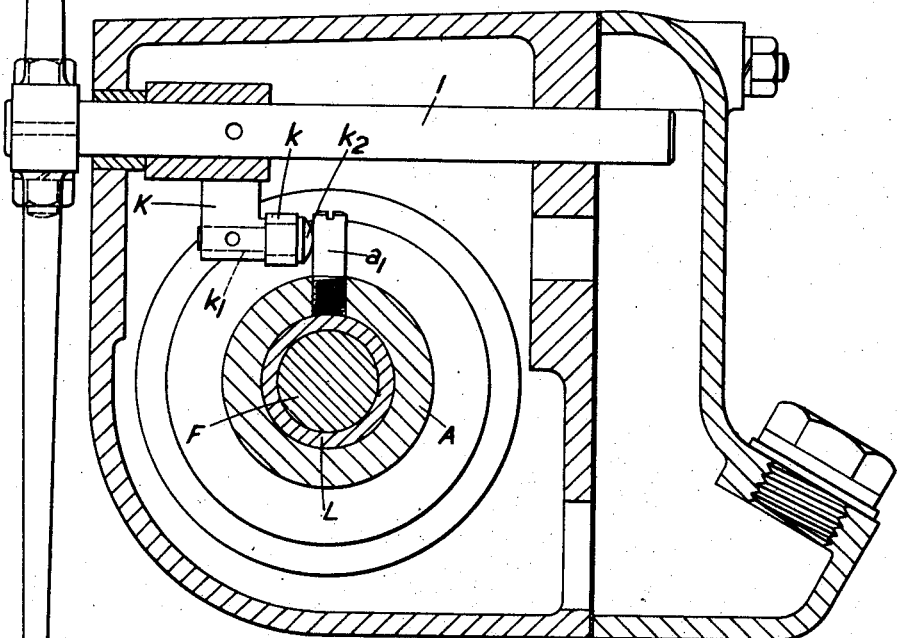
FIG. 2.
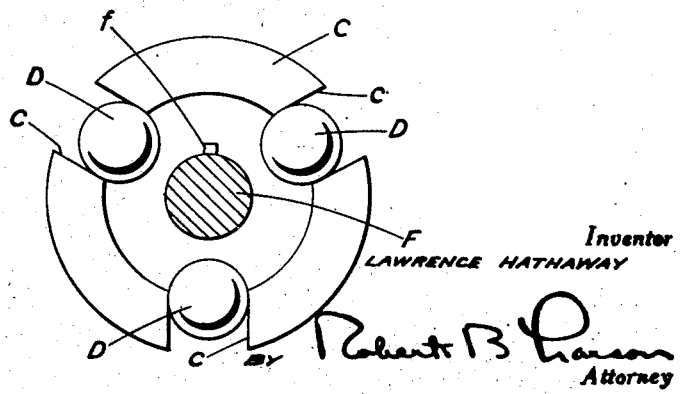
FIG. 3.
Inventor
LAWRENCE HATHAWAY
Attorney Patented Jan. 11, 1944

2,338,718

UNITED STATES PATENT OFFICE

2,338,718

CENTRIFUGAL GOVERNOR

Lawrence Hathaway, Coventry, England, assignor to Coventry Climax Engines Limited, Coventry, England, a company of Great Britain Application May 22, 1942, Serial No. 444,121
In Great Britain December 27, 1941

3 Claims. (Cl. 264—17)

This invention relates to governing mechanism for engines and other machines.

Centrifugal governors have been made, for example, for use with internal combustion engines, such as liquid fuel injection compression ignition engines, in which members such as steel balls or rollers are interposed between members having mutually-inclined faces, so that the balls are carried round by a member driven in accordance with engine speed and consequently move outwards under the action of centrifugal force. Owing to the relative inclinations of the surfaces, these are separated by a camming action and the consequent axial movement is used to adjust the control member of the engine. It is usual to make one of the members with a flat face and the other in the form of a conical or other shaped cup. If one of these members only is driven, the steel balls and the other member are carried round by friction, and there is no certainty, especially after a certain amount of wear has occurred, that there will not be a considerable amount of slipping, and consequently the speed of the balls may be somewhat indefinite. It has been proposed to enclose the balls in radial tracks formed between webs projecting from the driven member which may be that with the flat surface. Then the balls are carried round at a speed which is strictly proportional to engine speed, but it is clear that as they move outwards, they cannot merely roll on the surfaces with which they are in contact, but there must be a certain amount of skid which gives rise to wear and uncertain action.

The object of the present invention is to avoid this drawback and to mount the balls, rollers, or other members subject to centrifugal force in such a way that they will be positively driven at a speed proportional to engine speed, and during their outward excursions can roll truly on the member of the governor which is prevented from rotation.

To that end, the balls are carried by an additional member which is interposed between the two mutually-inclined surfaces and which is positively driven at a speed proportional to engine speed. One of the inclined members, preferably the cup-shaped member, although that is not essential, is mounted so as to be incapable of rotation, and the other is mounted free, that is to say, in a floating condition, for example, on a suitable ball or other bearing, and is only driven due to the engagement of the balls. The third member may conveniently be in the form of a cage keyed or otherwise secured to a shaft geared to the engine shaft, and the balls are carried in radial slots or tracks opening to the periphery of the cage so that the balls are carried round positively with the cage and under the action of centrifugal force, move outwardly in the tracks and cause separation of the mutually-inclined surfaces.

The member which is prevented from rotation may be mounted to slide axially, and the other or floating member may be constrained from axial movement. Then the axially-moving member has to have a connection with the engine control mechanism. This might be effected merely by having a roller on a lever connected to the engine control and engaging a groove in the axially-movable member of the governor, but that alone would not positively prevent the axially-moving member from rotating. That, however, might be provided for by having a guide pin fixed to the casing of the apparatus and engaging a longitudinal slot in the axially-moving member, but in such a case there would be considerable frictional resistance to the axial movement of the governor member. The present invention therefore also provides a method of preventing rotation of the axial-moving governor member, while imposing the smallest possible resistance to its axial movement. This is effected in accordance with the invention by arranging for a lever connected to the engine control to engage a groove in the axially-moving governor member, and being provided with an anti-friction roller for that purpose; this same lever is used to prevent rotation of the axially-moving member, and for that purpose it may have a rounded end which engages a radial pin screwed into the axially-moving governor member at the bottom of the said groove. Then, under the tendency of rotating the axially-moving member due to the engagement of the steel balls, the said pin is held against the rounded end of the lever connected to the engine control. When the axially-moving member is moved, the only friction between it and a fixed part is that between the said pin and the rounded end of the lever, and the relative movement is very small because it is only the relative radial movement between those to two parts due to the obliquity of the said lever.

In order that the invention may be clearly understood and readily carried into effect, a form of construction of a governor in accordance therewith will now be described by way of example with reference to the accompanying drawings, in which:

Figure 2 is a transverse section taken on the line II—II in Figure 1; and

Figure 3 is a transverse section taken on the line III—III in Figure 1.

Figure 1:
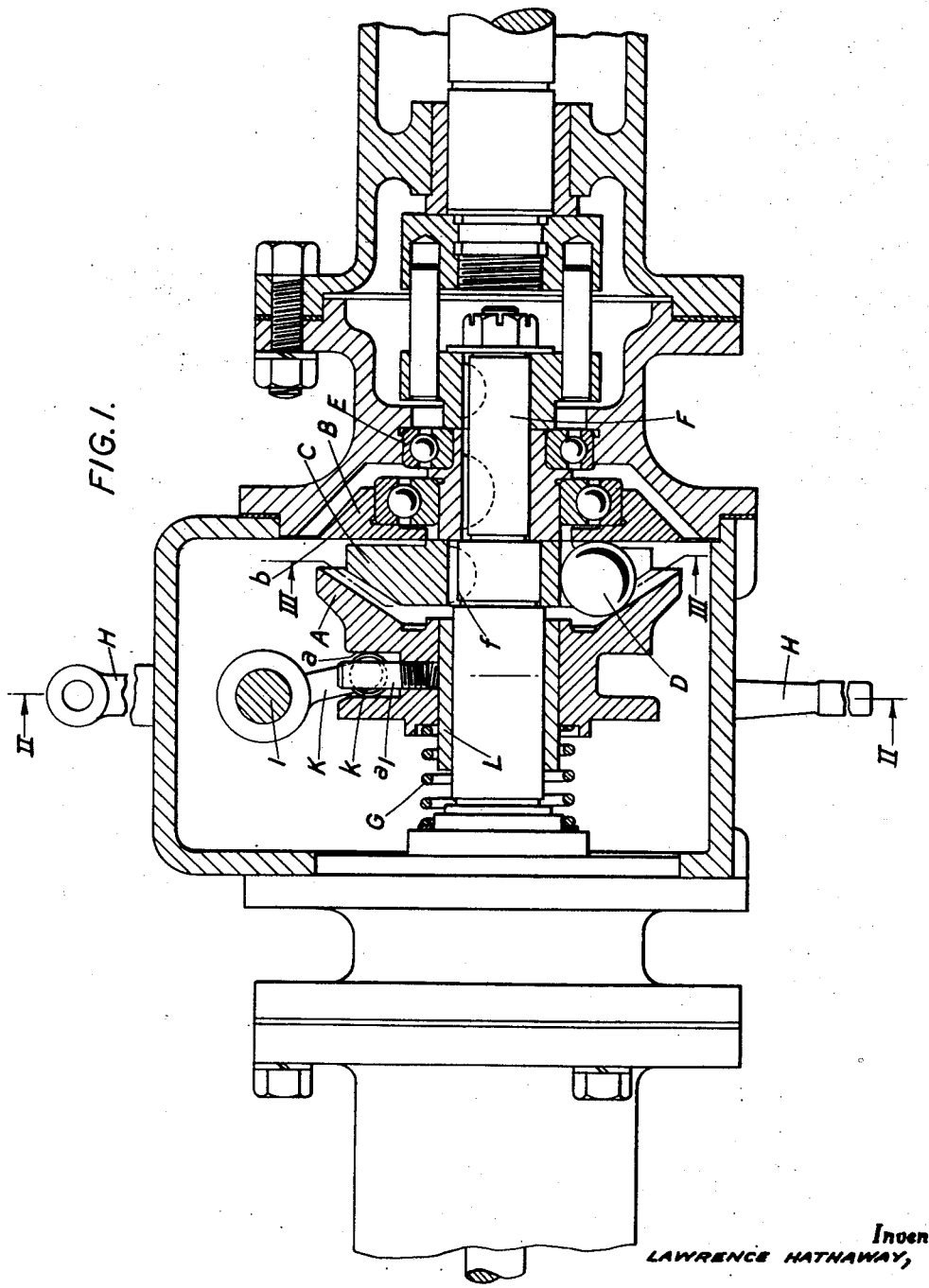
Figure 1 is a side elevation partly in central section of the governor and the associated parts.

In the particular construction illustrated, the axially-movable governor member which is prevented from rotating is formed as a conical cup A. The other member with its face inclined relatively to that of the cup A is a member B with a flat face $b$ and is mounted to float on a ball-bearing E. The third member of the governor is an intermediate cage C seen clearly in Figure 3 and lying between the members A and B. It carries the steel balls D which form the centrifugal bodies and which are lodged in radial tracks or grooves $c$ in the cage C. The latter is connected by a key $f$ to a shaft F which runs at a speed proportional to that of the engine and, in this particular instance, is the magneto shaft. When the shaft F runs up to speed, the steel balls D move outwardly and as the member B is prevented from axial movement, the conical member A is forced away from it, to the left in Figure 1, against the action of a coiled compression spring G. As the member B is freely mounted on the ball bearing E, it turns freely being driven by the steel balls D and there is no relative rotary movement between the steel balls D and the face $b$. On the other hand, the conical member A is prevented from rotation as will be explained later so that the steel balls D can roll on it as they rotate during their outward and inward movements. Therefore, the steel balls D operate much in the same way as the planet wheels of a planetary gearing. They engage the face of the non-rotatable member A and they rotate the floating member B at double the speed of rotation of the shaft F.

It is realised, of course, from the above that the slidable conical member A should be capable of moving against the action of the spring G with a minimum amount of friction and its sliding movement is communicated to the engine controls in exerting the governing action. The engine controls are connected to a lever H which is mounted to rock about a transverse spindle I. A short lever K which co-operates with the conical member A is also pinned to the spindle I and its end projects into an annular groove $a$ in the conical member A where it is provided with an anti-friction roller $k$ against which one or other of the side walls of the groove $a$ bears. The pin $k_1$ on which the roller $k$ is mounted has a rounded head $k_2$ which, when the governor is rotated, is engaged by a radial pin $a_1$ which is screwed into the cylindrical wall of the member A at the bottom of the groove $a$. When the governor is in operation, the steel balls D tend to rotate the conical member A in the counter-clockwise direction as seen in Figure 2 so as to maintain the pin $a_1$ in contact with the rounded head $k_2$. Thus the conical member A is prevented from rotating but it can slide freely under the thrust from the steel balls D since it is mounted on a sleeve L on the shaft F and when it slides one way or the other, the levers K and H are turned accordingly. Thus, the only relative movement between the pin $a_1$ and the rounded head $k_2$ is a slight radial movement due to the obliquity of the lever K and it can be seen from Figure 1 that that movement is, in fact, very small. The result is therefore attained that the conical member A is prevented from rotation without any appreciable resistance to its axial sliding movements.

1. A centrifugal engine governor comprising in combination, a governor member mounted to rotate freely but held against axial movement, a second governor member mounted to move to and from said first-mentioned governor member and formed with a surface facing a surface of said first-mentioned governor member and inclined relatively thereto, means for exerting a resilient force urging said second-mentioned governor member towards said first-mentioned member, a plurality of centrifugal elements coacting with and housed between said two governor members and mounted to be carried round at a speed proportional to the engine speed, a pivoted engine control lever engaging in a recess in said second-mentioned governor member so as to be rocked in accordance with movements of said member to and from said first-mentioned governor member and a radial peg secured in said second-mentioned governor member and engageable by said lever to prevent rotation of said second-mentioned governor member, said engagement being effected over a relatively small area.

2. A centrifugal engine governor comprising in combination, a governor member mounted to rotate freely but held against axial movement, a second governor member mounted to move to and from said first-mentioned governor member and formed with a surface facing a surface of said first-mentioned governor member and inclined relatively thereto, a compression spring acting on said second-mentioned governor member to urge same towards said first-mentioned member, a plurality of centrifugal elements coacting with and housed between said two governor members and mounted to be carried round at a speed proportional to the engine speed, a pivoted engine control lever engaging in an annular groove in said second-mentioned governor member so as to be rocked in accordance with movements of said member to and from said first-mentioned governor member and a radial peg secured to said second-mentioned governor member in said annular groove in position to be engaged by said lever and prevented from rotation thereby.

3. A centrifugal engine governor comprising in combination, a governor member mounted to rotate freely but held against axial movement, a second governor member mounted to move to and from said first-mentioned governor member and formed with a surface facing a surface of said first-mentioned governor member and inclined relatively thereto, a compression spring acting on said second-mentioned governor member to urge same towards said first-mentioned member, a plurality of centrifugal elements coacting with and housed between said two governor members and mounted to be carried round at a speed proportional to the engine speed, a pivoted engine control lever, an anti-friction roll carried by said lever and engaging in an annular groove in said second-mentioned governor member to cause said member to be rocked in accordance with movements of said member to and from said first-mentioned governor member and a radial peg secured to said second-mentioned governor member in said annular groove in position to be engaged by a rounded end surface of said lever and prevented from rotation thereby.

LAWRENCE HATHAWAY.